United States Patent
Cheung et al.

(10) Patent No.: US 7,133,168 B2
(45) Date of Patent: Nov. 7, 2006

(54) PORTABLE COILABLE ELECTRONIC APPARATUS AND METHOD

(75) Inventors: Patrick C. P. Cheung, Castro Valley, CA (US); Kimon D. Roufas, Mountain View, CA (US); James E. Reich, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 942 days.

(21) Appl. No.: 10/317,735

(22) Filed: Dec. 12, 2002

(65) Prior Publication Data

US 2004/0114200 A1    Jun. 17, 2004

(51) Int. Cl.
    *H04N 1/04*    (2006.01)
(52) U.S. Cl. .................. 358/497; 358/472; 358/473; 347/108; 347/109
(58) Field of Classification Search .......... 358/497, 358/472, 473; 347/108, 109
    See application file for complete search history.

(56) References Cited

U.S. PATENT DOCUMENTS

| | | | |
|---|---|---|---|
| 5,446,559 A * | 8/1995 | Birk | 358/473 |
| 5,685,651 A * | 11/1997 | Hayman et al. | 400/88 |
| 6,208,427 B1 * | 3/2001 | Lee | 358/1.15 |
| 6,270,271 B1 * | 8/2001 | Fujiwara | 400/693 |
| 6,367,993 B1 | 4/2002 | Day et al. | 400/88 |
| 6,392,674 B1 | 5/2002 | Hiraki et al. | 345/857 |
| 6,481,905 B1 * | 11/2002 | Day et al. | 400/88 |
| 6,674,543 B1 * | 1/2004 | Day et al. | 358/1.8 |
| 6,736,502 B1 * | 5/2004 | Deguchi | 347/108 |

* cited by examiner

*Primary Examiner*—Kimberly Williams
*Assistant Examiner*—Andrew Lam
(74) *Attorney, Agent, or Firm*—Linda M. Robb

(57) ABSTRACT

A portable, compact electronic device is disclosed which is adapted for communication with a personal digital assistant. The electronic device includes a housing having an opening adapted for receiving a medium adapted for printing or scanning and at least one coiled structure formed from a coilable material. At least one guide positions the coilable material as it is extended from the coiled structure. The printing or scanning medium is moved through an opening in the housing by rotating elements. An activation means is utilized to perform printing or scanning of the medium, under the controlled extension and retraction of the coilable material from the coiled structure.

33 Claims, 13 Drawing Sheets

PORTABLE COILABLE ELECTRONIC APPARATUS AND METHOD

INCORPORATION BY REFERENCE

The following U.S. patents are fully incorporated herein by reference: U.S. Pat. No. 6,208,427 to Lee ("Personal Digital Assistant (PDA) Printer Apparatus and Printing Method"); U.S. Pat. No. 6,392,674 to Huggins et al. ("Portable Printer"); and U.S. Pat. No. 6,367,993 to Day et al. ("Printer System").

BACKGROUND OF THE INVENTION

This invention relates generally to printers, and more particularly to portable printers that may be used with a personal digital assistant.

A number of portable printers for use with computers or other electronic devices are known in the art. For example, U.S. Pat. No. 6,367,993 to Day et al. for a "Printer System" teaches a portable printer which resides in a base station connected to a computer when not in use. When it is desired to execute a printing application, the printer is removed from the base station and is manually placed on a print medium to initiate printing. Print alignment is achieved visually through a transparent window in the printer casing. The window may also be opened for inserting an ink cartridge into the printer before use.

A lightweight, portable printer for the production of labels is described in U.S. Pat. No. 6,394,674 to Huggins et al. for a "Portable Printer". Huggins teaches a battery-operated unit into which label supplies are loaded for printing. In this case the printing medium is fed through the printer rather than the printer being placed on the printing medium. The printer housing contains a motor-driven print head, a platen roll and gear, a holder for a supply roll of labels, a battery compartment, and various other features.

In contrast to this approach, U.S. Pat. No. 6,208,427 to Lee for a "Personal Digital Assistant (PDA) Printer Apparatus and Printing Method" teaches a PDA printer which is able to output a note without a header, as if the note were printed by a printer. In a conventional PDA, a note is printed by direct connection to a printer or by using a fax transmission. However, the former method requires a driver program for driving the printer, which results in development constraints upon the driver program and portable printer. As a result, fax transmission is generally used. To achieve a printing method in which a fax transmission function is improved by outputting a note without a header, the Lee device provides a display, a fax modem memory, and a method for printing a fax transmission without a header.

SUMMARY OF THE INVENTION

Briefly stated, and in accordance with one aspect of the present invention, there is disclosed a portable, compact electronic device which is adapted for communication with a personal digital assistant. The electronic device includes a housing having an opening adapted for receiving a medium adapted for printing or scanning and at least one coiled structure formed from a coilable material. At least one guide positions the coilable material as it is extended from the coiled structure. The printing or scanning medium is moved through an opening in the housing by rotating elements. An activation means is utilized to perform printing or scanning of the medium, under the controlled extension and retraction of the coilable material from the coiled structure.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

The portable coilable device disclosed herein operates as a printer or scanner attachment to various electronic devices, such as the palm pilot personal digital assistant (PDA), among others. One requirement for such devices is that their physical size not be limited by the size of the print medium. For example, the majority of home/office printers and scanners currently on the market have at least one dimension longer than the 8.5 inches required for printing or scanning a portrait letter size page. In the following discussion, the subject coilable device will be described in terms of a printer, however, the coilable device could also be beneficially employed as a scanner as well as in other electronic applications, all of which are fully contemplated by the specification and the breadth of the claims herein.

Figure 1:
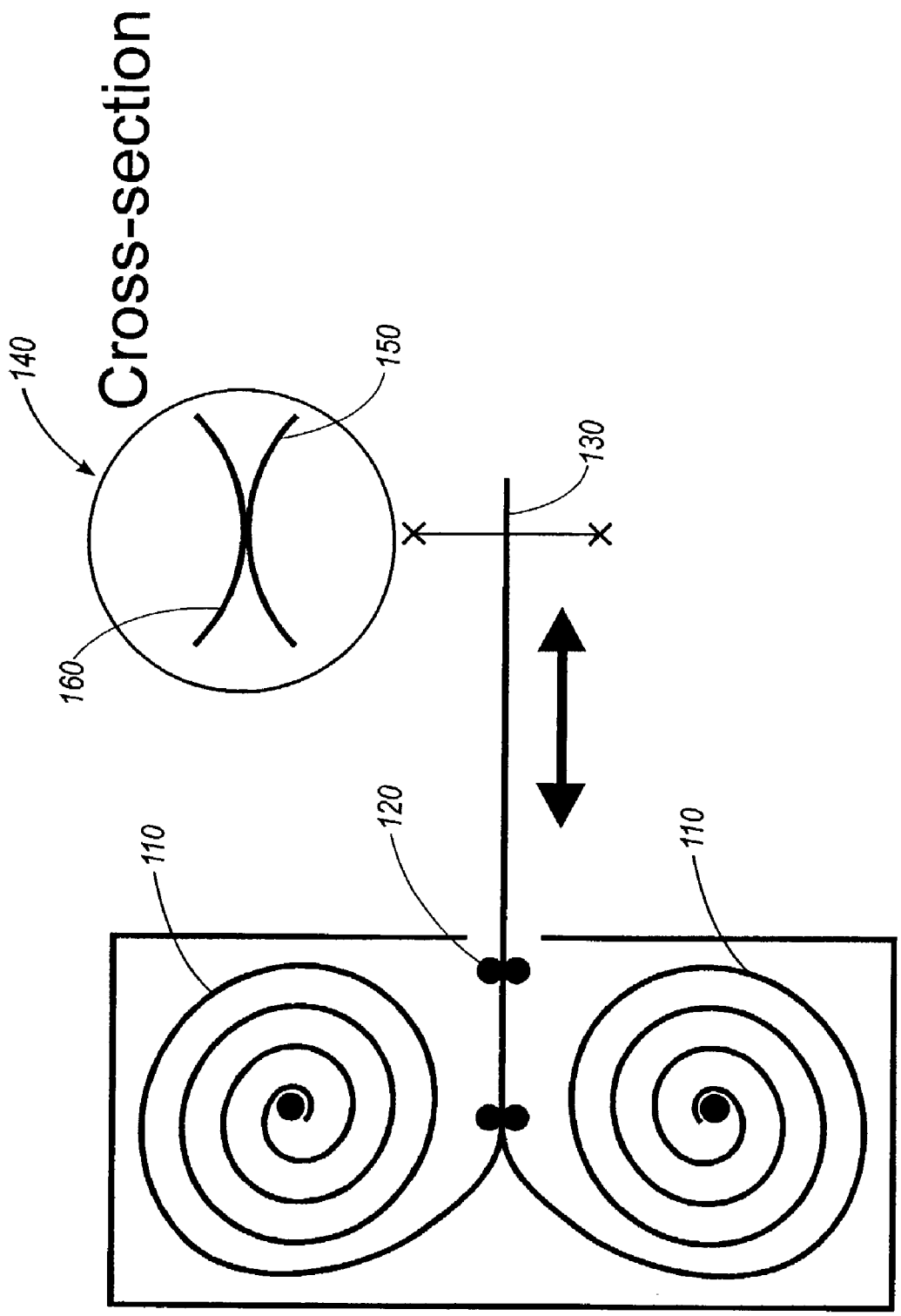
FIG. 1 illustrates a top view of the operational concept of a double spool embodiment of the subject invention.

Turning now to FIG. 1, there is illustrated a top view of the operational concept of a double spool embodiment of the subject invention as well as an example cross-sectional configuration. Any coilable material which can deform and coil around a spool without being permanently deformed is contemplated for fabrication of the coilable arm. For example, the coilable material may be formed of a resilient metallic ribbon having a concavo-convex cross-section coiled in an internal or "inside wound" fashion. To this substrate kapton and/or copper may be laminated to form multiple conductors along the coil. Slip contacts at the center of the spool may be utilized to carry electrical power and signals to external circuits. The coilable material is coiled against the inner periphery of an annular surface and, when the leading end of the tape is laterally displaced from the coil, the tape will automatically uncoil into a straightened, relatively stiff configuration without the necessity of a separate spring. This structure is wound onto two spools 110 when the printer is not in operation and is extended through guides 120 to form an extendable cantilever printer arm when printing is to be initiated. This configuration provides good bending stiffness in all directions, resistance to buckling, and a relatively low printer profile. Printer arm 130 may have various cross-sectional configurations, for example two facing arcs or two opposed arcs 150 and 160 as shown in cross-section 140. However, it will be appreciated by one skilled in the art that other cross-sectional configurations could be similarly beneficially employed. The example configurations allow the weakest bending stiffness of one of the arm extensions to be compensated by the other opposed arm extension, resulting in a cantilever arm that is reasonably stiff and is resistant to buckling. Additionally, this configuration provides a form factor with a low profile, since spools 110 lie flat, thus permitting a thin design for the portable printer.

Figure 2:
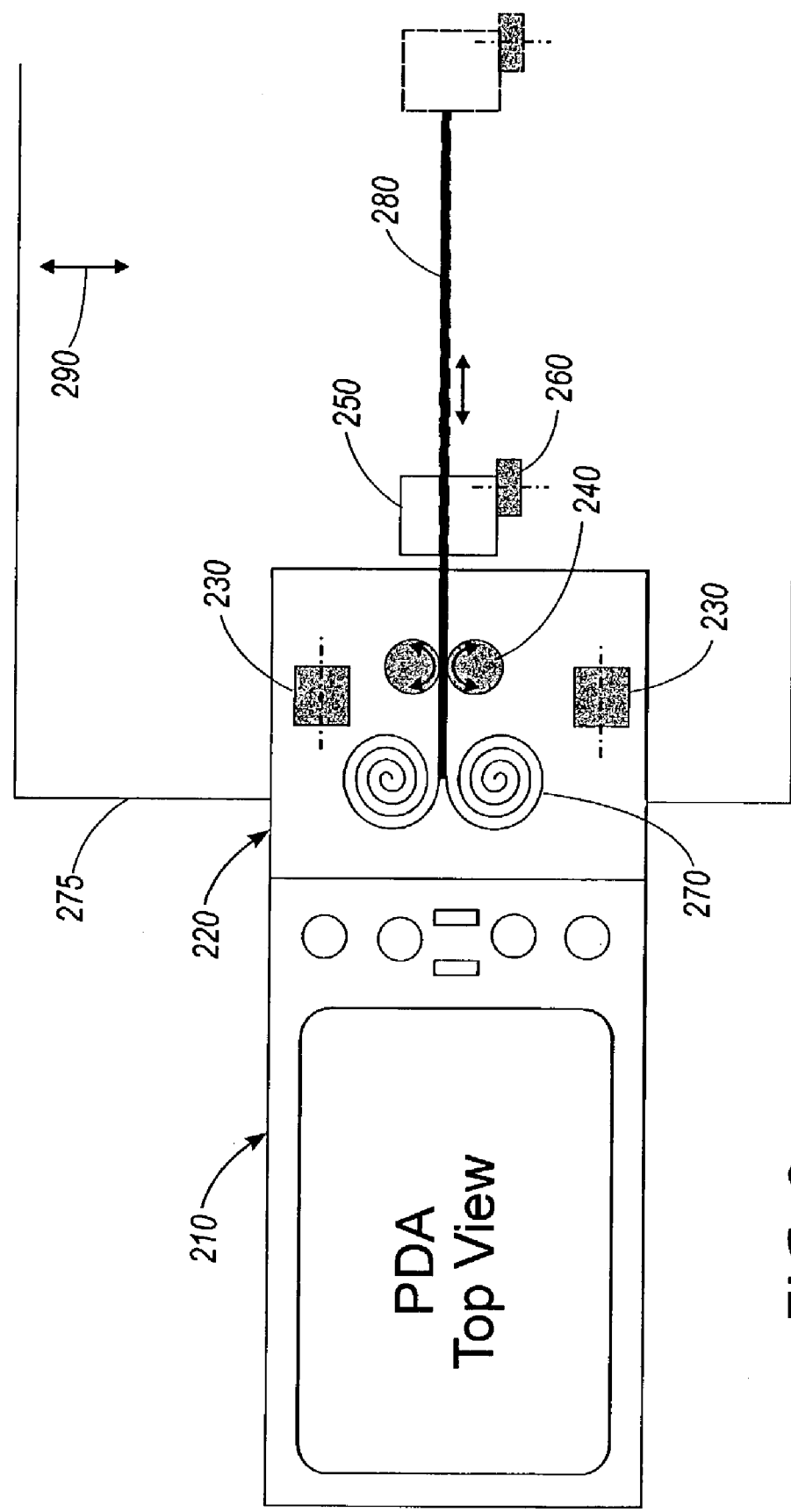
FIG. 2 illustrates a more detailed top view of a double spool embodiment of the subject invention.

Referring now to FIG. 2, there is shown a top view of one embodiment of the subject invention. Here the portable printer 220 is attached as a modular unit to PDA 210. Paper 275 is driven by rotating elements 230 through a slot underneath the coilable structures 270, which have extended through guides 240 as printer arm 280, carrying print or scanner head 250 in a direction traverse to the direction of movement of paper 275. Equally spaced rectangular marks may be printed along the length of the coilable material. Such marks, in conjunction with an optical emitter and sensor, may be used to measure the amount of coiled material being extended out from rotating elements 230. This position signal may then be used in feedback control of position and velocity by rotating elements 230. Rotating element 260 maintains a constant distance between printer or scanner head 250 and paper 275 as well as supporting the head of the printer or scanner. The print head may also be extended beyond the outer edge of paper 275 such that rotating element 260 moves off the paper's edge, at which position the paper can be advanced, as indicated by arrows 290. Both coilable structures 270 are mounted within printer 220 in a plane parallel to the plane of paper 275. The core of coilable structures 270 may also include a motor controlling extension and retraction of the coiled material. Alternatively, a preloaded spring in the core of coilable structures 270 may be utilized to maintain the coiled configuration of the coilable structures.

Figure 3:
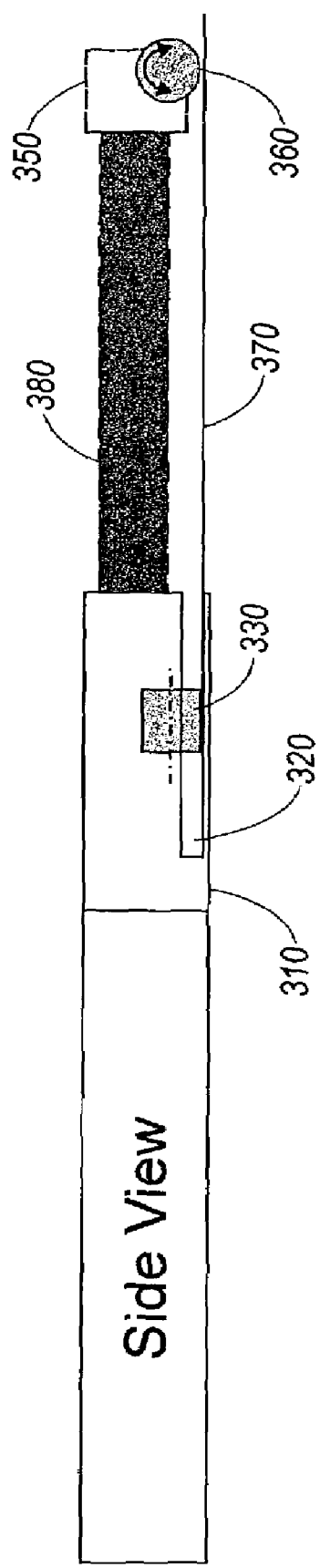
FIG. 3 illustrates a side view of the embodiment of FIG. 2.

A side view of this embodiment is illustrated in FIG. 3, where housing 310 includes slot 320, through which paper 370 moves when the print head is in operation. As can be seen in the figure, rotating element 330 contacts paper 370 in the slot to cause movement of paper 370. Printer arm 380 is in an extended position along which print head 350 may move as it is supported by roller 360. To initiate printing, a user inserts the left, top corner of paper 370 up from below lower roller 330, with paper 370 placed against the inner edge of slot 320. The user then initiates a start command from the PDA, causing roller 330 to rotate and draw paper 370 towards print head 350. An optical detector inside slot 320 may be utilized to identify the top edge of paper 370 and advance the paper to the start position for printing. The coilable printer arm 380 is then extended along the width of paper 370 and ink is deposited in each pixel location traversed by print head 350.

Figure 4:
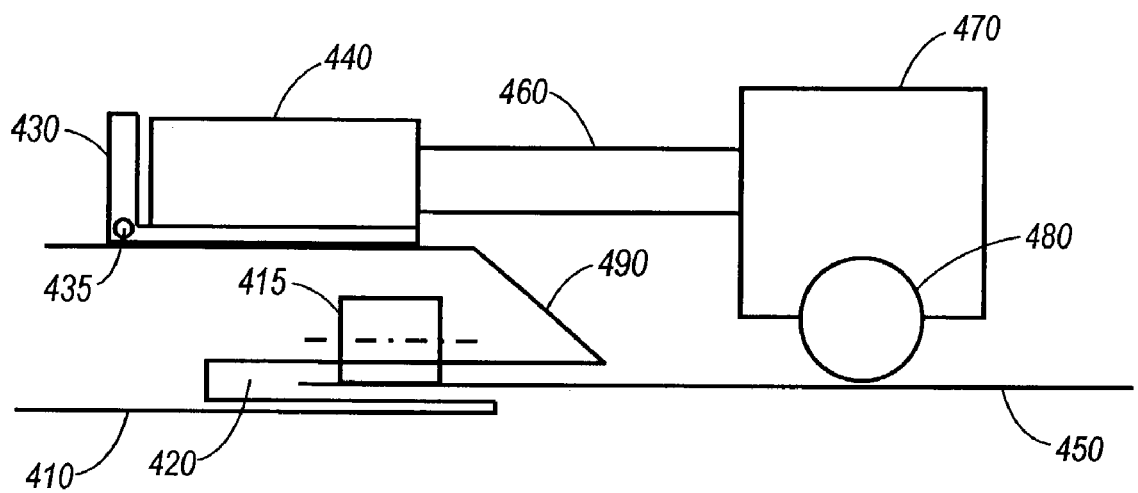
FIG. 4 illustrates a side view of an alternate double spool embodiment of the subject invention.
Figure 5:
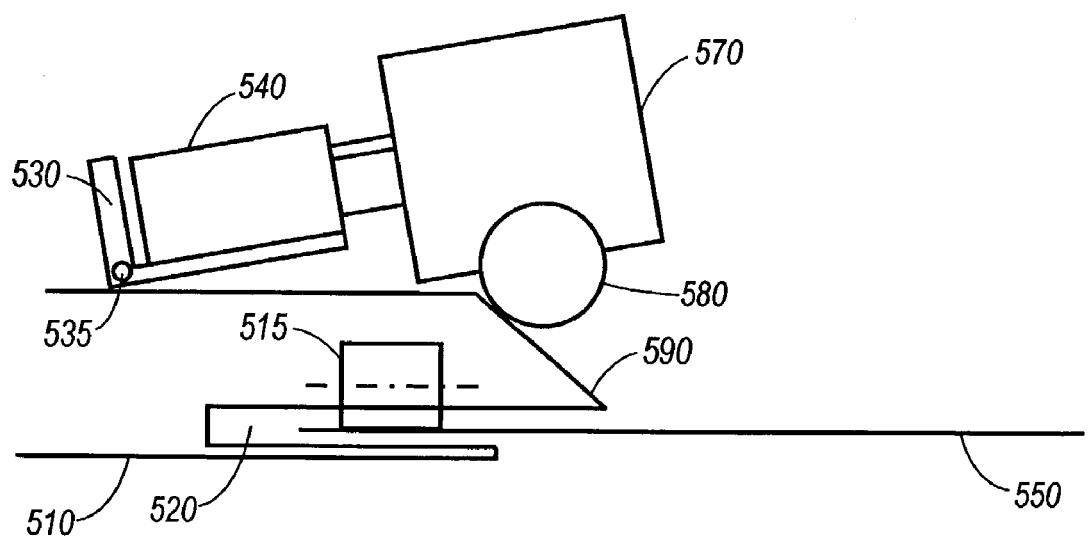
FIG. 5 illustrates an operational side view of the double spool embodiment of FIG. 4.

Turning now to FIGS. 4 and 5, a partial illustration of an alternate embodiment of the subject invention is shown. In this embodiment, print head 470, supported by rotating element 480, moves along printer arm 460 across paper 450. In this figure, only the bottom portion of housing 410 is illustrated, with paper 450 moving through slot 420. Coilable structures 440 are supported by hinge structure 430 having hinge point 435. However, in this embodiment, ramp 490 permits the print head's rotating element to unload from paper 450 when the cantilever arm is fully retracted, as shown in FIG. 5. An optional locking mechanism (not shown) or housing structure (not shown) may be included to retain the rotating element in its retracted position when the printer is not in use. When rotating element 480 unloads from paper 450, a pair of rotating elements 415 in slot 420 continue to advance paper 450. As can be seen in FIG. 5, as rotating element 580 moves along ramp 590 with print head 570, hinge structure 530 rotates about hinge point 590 to continue to support coilable structures 540 when print head 570 is in a retracted position, while rolling elements 515 continue to advance paper 550.

Figure 6:
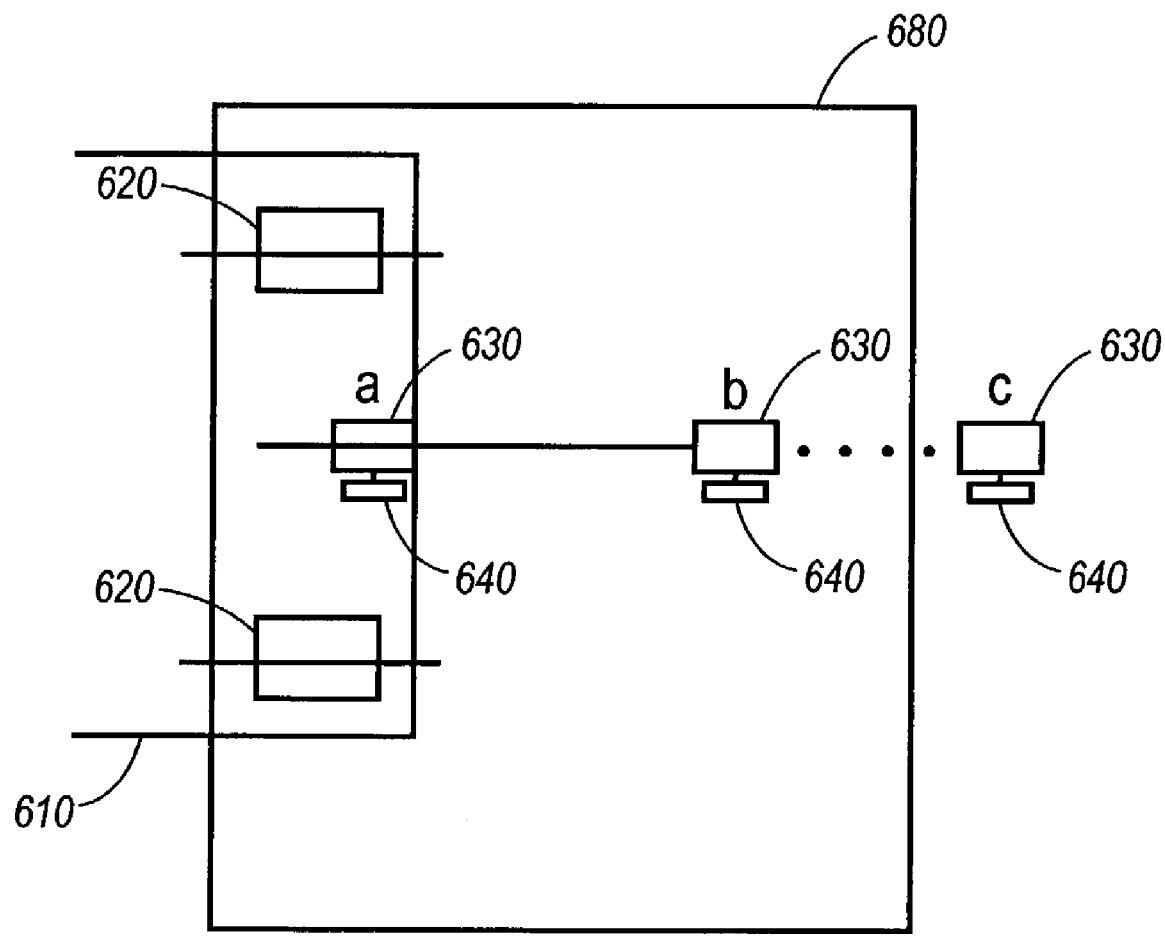
FIG. 6 illustrates a top view of the print head of the subject invention as it moves across the print medium.

The position of the print head relative to the print medium is illustrated in FIG. 6. Here partially-represented housing 610 contains rotating elements 620, which are capable of moving paper 680 from a page top position to a page bottom position. Print head 630, supported by rotating element 640, moves across paper 680 from retracted position "a" to a partially advanced position "b" and finally to a fully advanced position "c". In position "b" paper 680 cannot be advanced by rotating elements 620. However in positions "a" and "c" paper 680 is free to be moved up or down. Also, in this embodiment it should be noted that rotating element 640 is positioned relative to print head 630 such that rotating element 640 does not contact ink recently deposited on paper 680.

Figure 7:
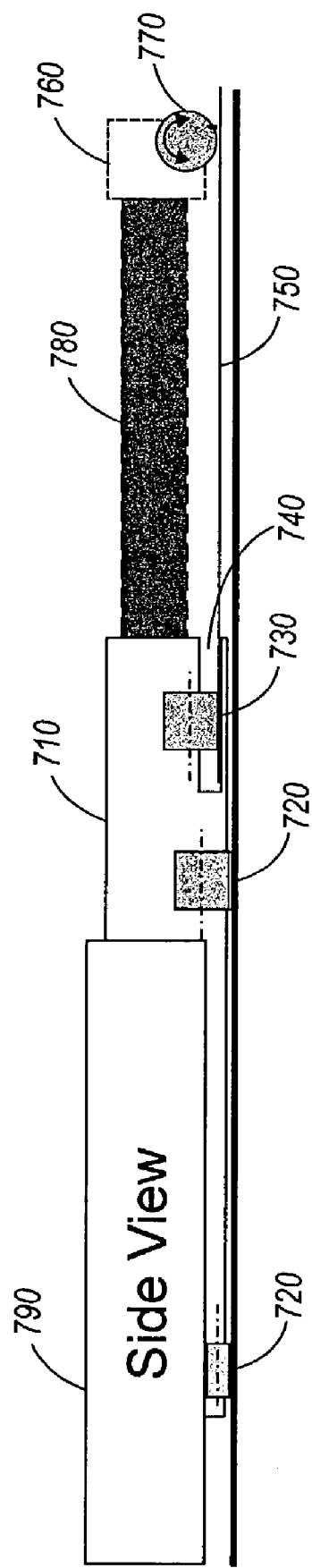
FIG. 7 illustrates a side view of an alternate double spool embodiment of the subject invention.

FIG. 7 illustrates a side view of yet another embodiment of the subject invention. Here additional rotating elements 720 are placed between PDA 790 and printer 710 so as to support and carry both PDA 790 and printer 710. Rotating elements 720 are beneficially employed in those situations in which the size of page 750 is so large that driving rotating elements 730 would tend to skew page 750 as it moves through slot 740. In this embodiment, paper 750 remains stationary while the printer moves relative to the paper after printer arm 780 has extended sufficiently for print head 760 and rotating element 770 to clear the outside edge of paper 750.

Figure 8:
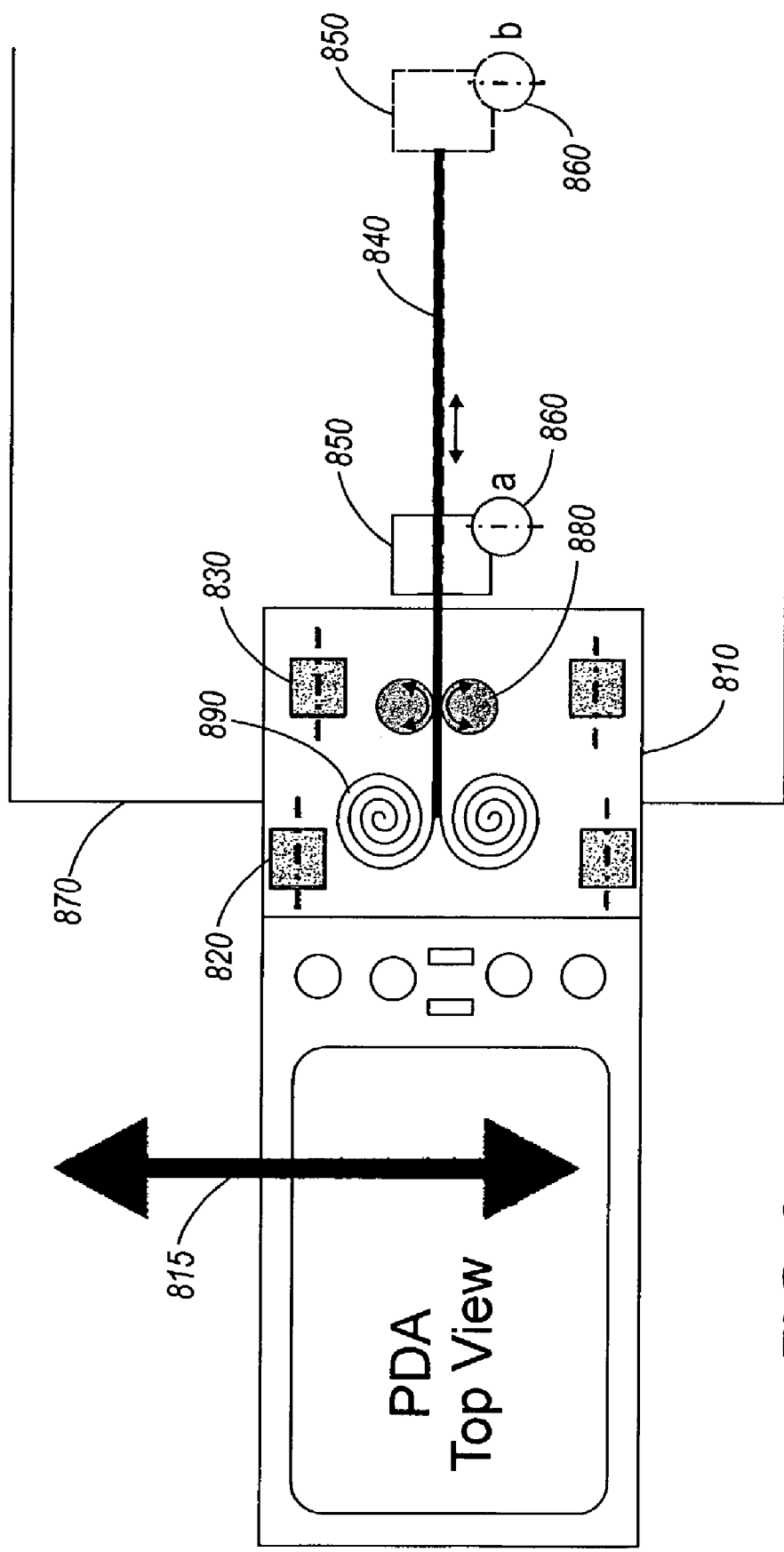
FIG. 8 illustrates a top view of the embodiment of FIG. 7.

A top view of this configuration is shown in FIG. 8. Here the PDA attached to printer 810 is in operating position midway down paper 870. Rotating elements 820 support printer 810 as it moves down paper 870 while print head 850 supported by rolling spherical element 860 moves back and forth across paper 870 on printer arm 840 from a first position "a" to a second position "b". Rotating elements 830 move in the same direction as rotating elements 820 to advance paper 870 relative to the PDA. Since the PDA also moves relative to the surface on which it is positioned, the two motions cancel each other and result in the movement of printer 810 but not paper 870.

Figure 9:
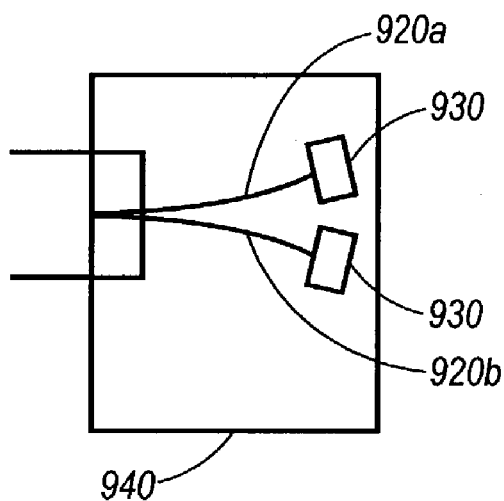
FIG. 9 illustrates possible skew of the print head as it moves across the print medium.
Figure 10:
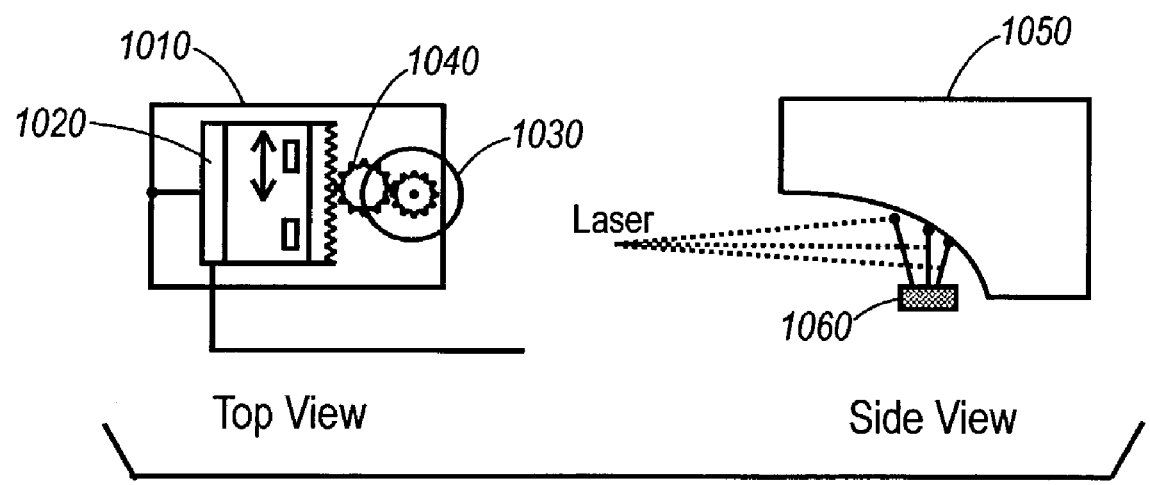
FIG. 10 illustrates a piggyback actuator that adjusts the print head position of an embodiment of the subject invention.

Turning now to FIG. 9, there is illustrated a possible skew of the printer arm to either position 920 "a" or 920 "b", causing print head 930 to be displaced on paper 940 during printing. This may be corrected as shown in FIG. 10, in which printer housing 1010 is partially illustrated. Here laser emitter 1020 is installed in the printer housing (shown in a top view) and a linear optical sensor 1060 may be installed in print head 1050 (shown in side view) to measure the deviation. In operation, a laser beam emitted from laser emitter 1020 from a source on the stationary side of printer housing 1010 is detected by a row of optical sensors 1060. The row of sensors may typically be comprised of tens to over a hundred individual optical sensors spaced from each other. The reflecting surface above sensors 1060 ensures that over a certain range of paper length variations the laser beam can still be directed onto the sensors. If print head 1050 deviates up or down as it is traversing left and right, the laser beam will shine on different portions of the row of optical sensors. The detected deviation may then be compensated for mechanically by having the printer head carried by actuator 1030 which shuttles the printer head through use of gears 1040 by the same amount of deviation in the opposite direction.

Figure 11:
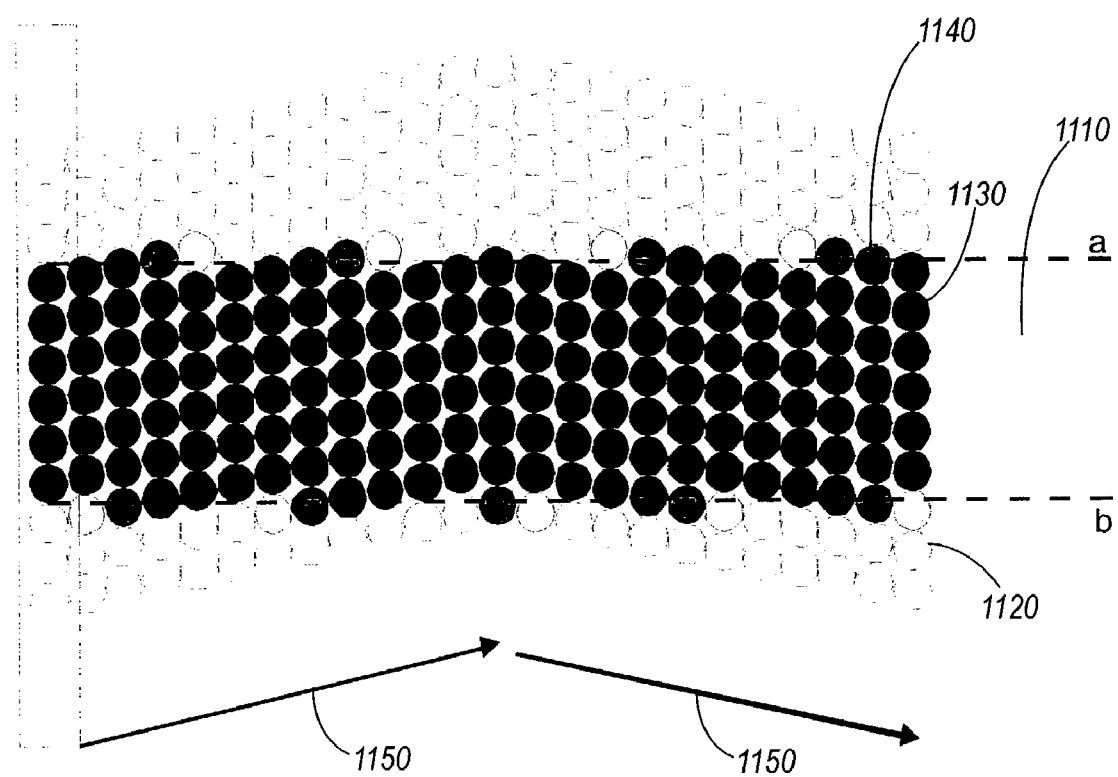
FIG. 11 illustrates a printing path adjustment to correct for possible skew of the print head as it moves across the print medium.

Alternatively, computing and then altering the ink pattern that comes out of unshuttled jets can correct the positional deviations, as illustrated in FIG. 11. This figure illustrates the ink deposition pattern for ink emitters in a print head as it moves across a sheet of paper depositing pixels of ink. In this example, print band 1110 has upper bound "a" and lower bound "b" when the actual print head path 1150 deviates from a straight path and is detected by the laser sensor. Ink emitters in the print head are reprogrammed to emit ink at droplet locations 1130 or partially emit ink at droplet locations 1140 within desired print band 1110. For those droplet locations outside of print band 1110, no ink is deposited, as shown at positions 1120.

Figure 12:
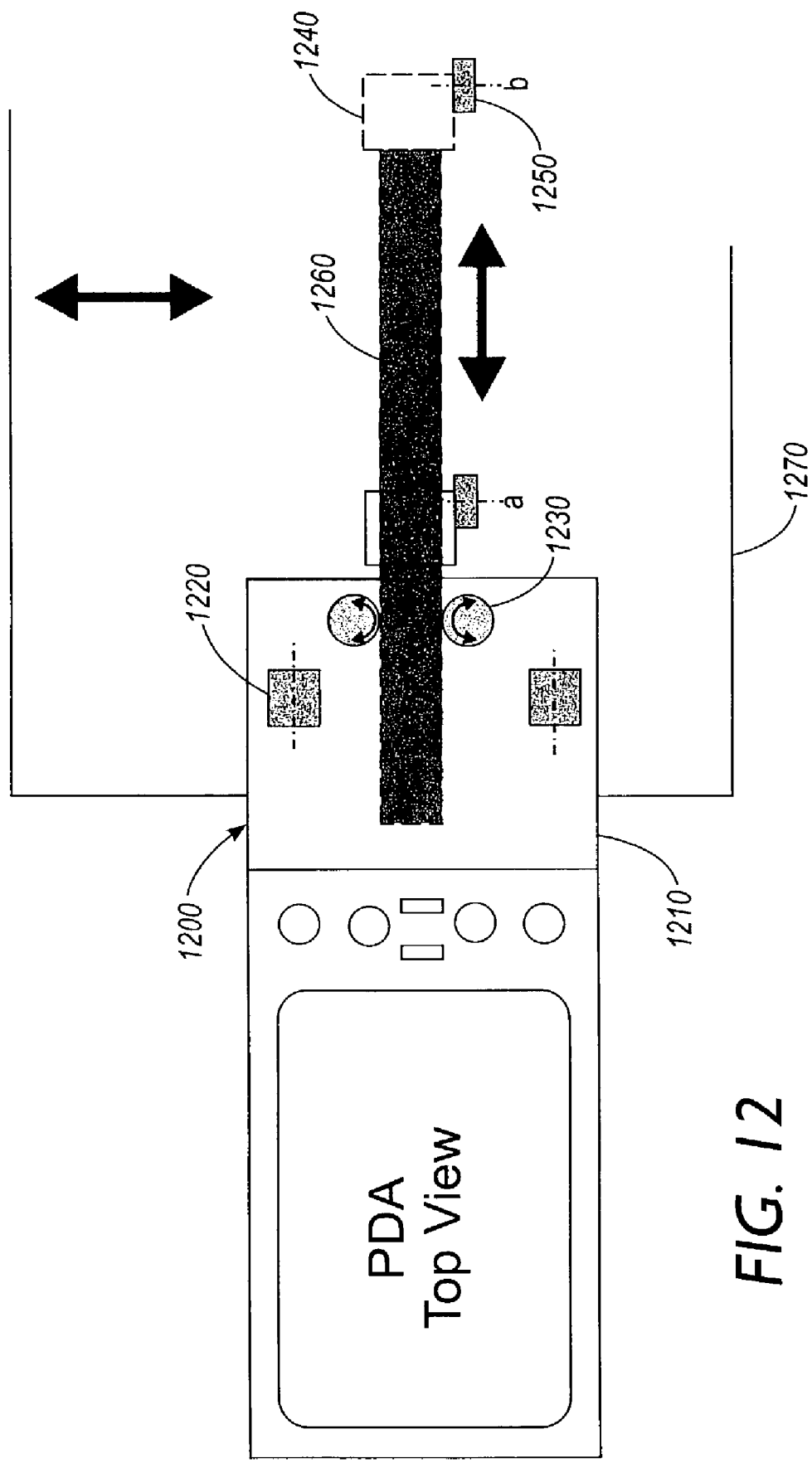
FIG. 12 illustrates a top view of a single spool embodiment of the subject invention.

Turning now to FIG. 12, there is shown another embodiment of the subject invention in a top view. As is the case with the above embodiments, the portable printer may be a modular attachment to a PDA or other electronic device. Here a single coiled material is utilized rather than two opposed coils. In this case lateral bending stiffness is enhanced through optimization of material specification and geometry. A requirement of the printer arm is that is should not deviate from the orthogonal direction at any position of its extension. Considering the accuracy requirement of a 600 dpi printer, a deviation of a few dots in the forward or reverse directions, which would be less than 200 microns, could result in unacceptable print quality. To correct for positional deviations, a laser guidance method is described hereinabove. Alternatively, a single spool implementation, such as that shown in FIG. 12, could minimize positional deviation to an acceptable amount without use of a laser subsystem.

In this example embodiment, portable printer 1200 includes housing 1210 and a slot (not shown) through which paper 1270 is driven by rotating elements 1220. Coilable structure 1260 extends and carries a print head 1240 from position "a" to position "b" in a direction traverse to the movement of paper 1270 through the printer slot. Rotating element 1250 maintains a constant distance between print head 1240 and paper 1270 while supporting print head 1240. Although print head 1240 at position "b" is shown as being positioned on paper 1270, print head 1240 may also be extended beyond the outer edge of paper 1270, at which position rotating element 1250 moves off the edge of paper 1270. In this furthest advanced position of print head 1240, paper 1270 may be advanced through the printer slot.

Figure 13:
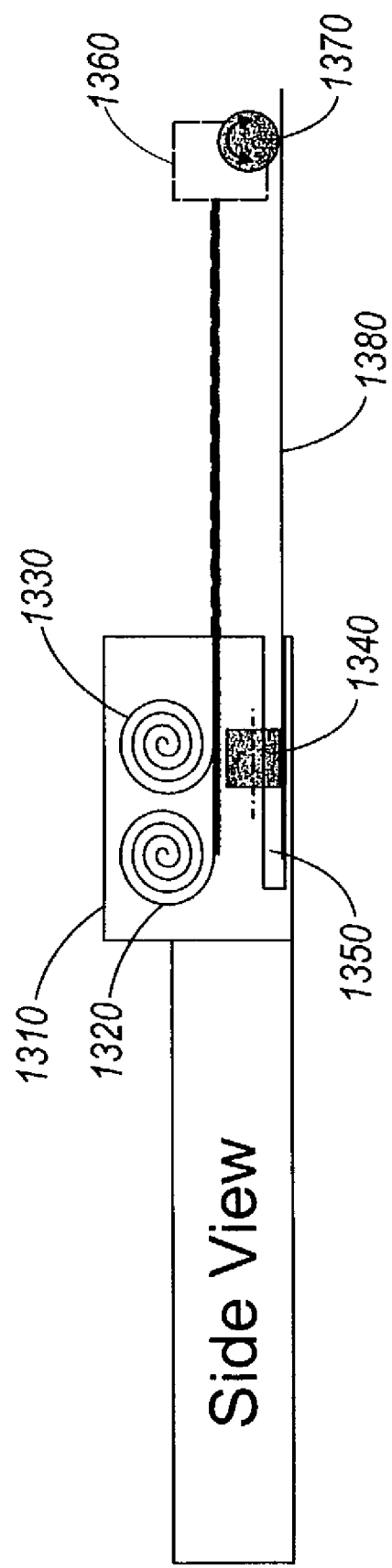
FIG. 13 illustrates a side view of the embodiment of FIG. 12.

Referring now to FIG. 13, which shows a side view of the embodiment of FIG. 13, coilable structure 1320 resides in housing 1310 and extends outward to carry print head 1360 supported by rotating element 1370 in a transverse direction on paper 1380. In this embodiment, an optional second structure 1330 may be present to feed signal and power cables between the printer body and print head 1360. Both coilable structure 1320 and coilable signal structure 1330 are mounted within housing 1310 in a plane orthogonal to the plane of paper 1380. Although in this example embodiment coilable structure 1320 and coilable signal structure 1330 are illustrated as separate structures, the two may be combined into a single structure. In this example, signal and power lines can be laminated into the load-bearing coilable structure.

Figure 14:
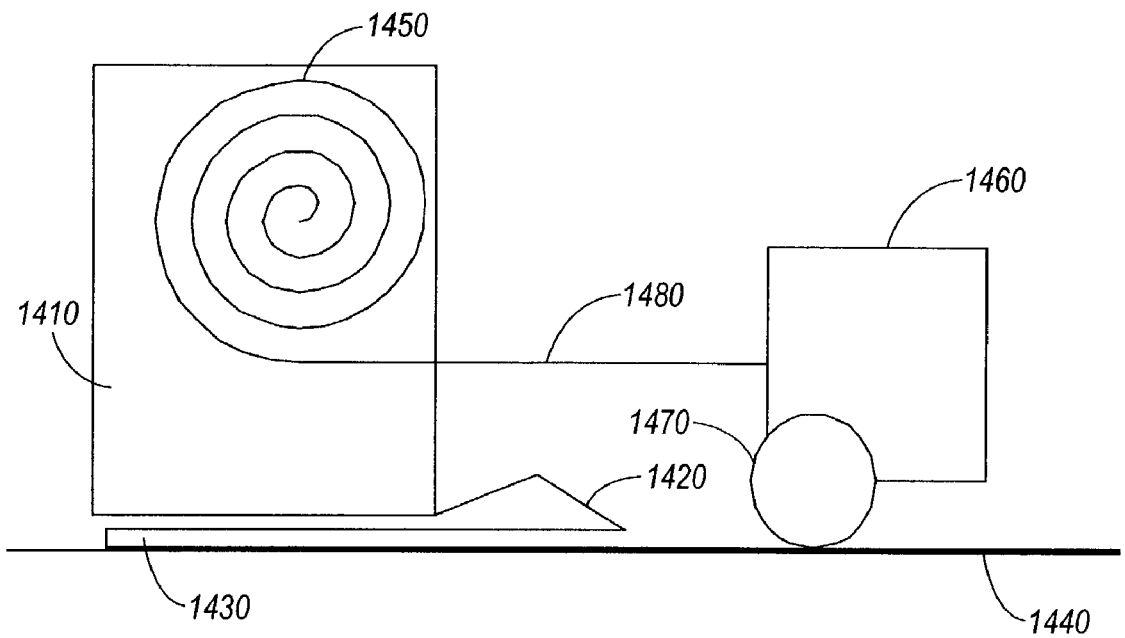
FIG. 14 illustrates another single spool embodiment of the subject invention.
Figure 15:
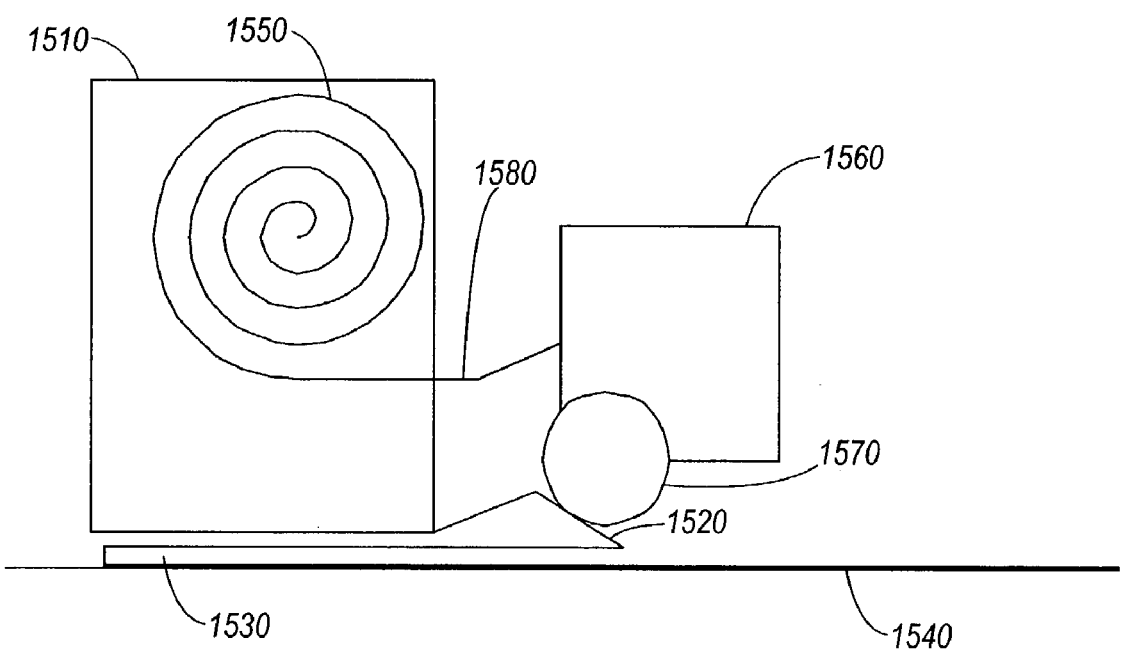
FIG. 15 illustrates the operation of the embodiment of FIG. 15.

Turning now to FIGS. 14 and 15, an alternate embodiment is illustrated. Here housing 1410, partially shown, includes ramp 1420, such that rotating element 1470 of print head 1460 will unload from paper 1440 when cantilever arm 1480 is fully retracted into coiled structure 1450. When rotating element 1470 unloads from paper 1440, a pair of rotating elements (not shown) in slot 1430 can advance paper 1440. Paper 1440 is positioned to move through slot 1430. FIG. 15 illustrates the relative positions of the coilable structure 1550 within housing 1510 (partially shown) and the print head when the print head is moving into a fully retracted position. As can be seen, as rotating element 1570 moves along ramp 1520 supporting print head 1560, coilable material extended from coiled structure 1550 flexes slightly at point 1580 as print head 1560 moves up ramp 1520 into a retracted position. At this position paper 1540 may be removed from slot 1530.

Figure 16:
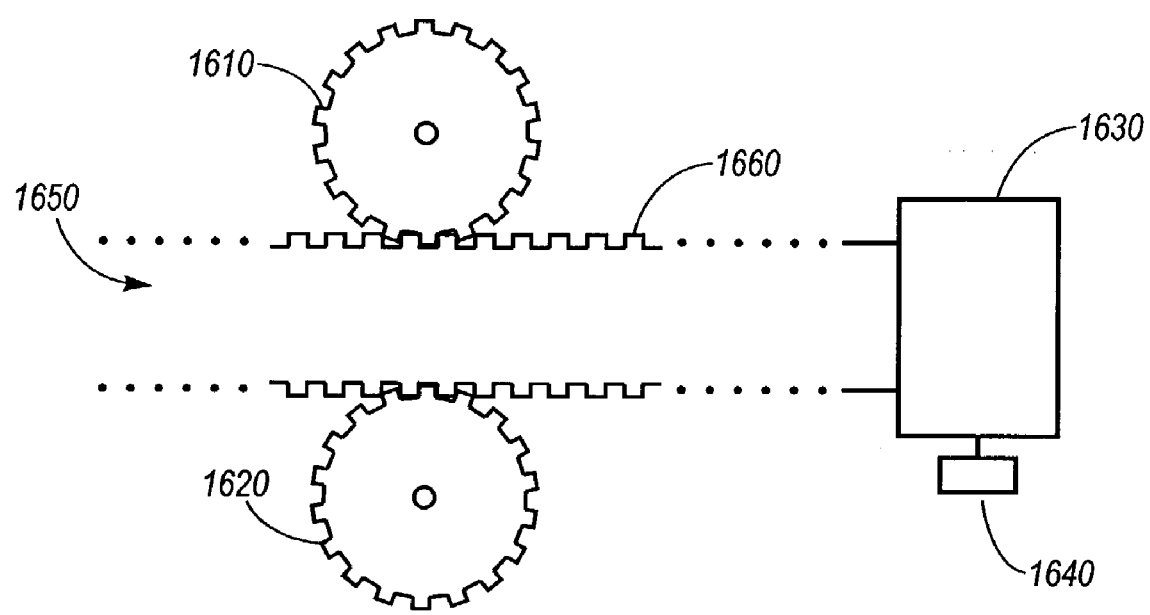
FIG. 16 illustrates another embodiment of the subject invention.
Figure 17:
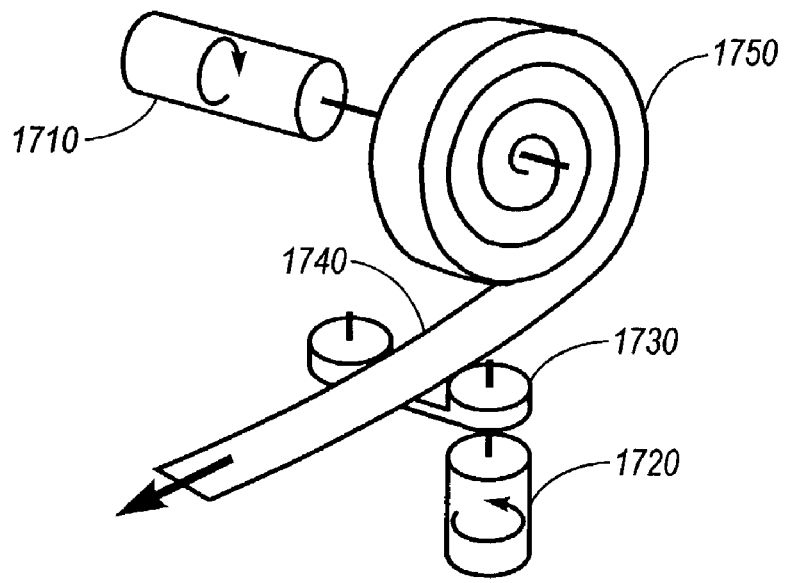
FIG. 17 illustrates use of a motor to control winding and unwinding of the spool of the subject invention.

Referring to FIG. 16, another embodiment of the coilable structure utilizes driving gears 1610 and 1620 opposing each other on opposite sides of uncoiled structure 1650. In this embodiment, teeth are formed into the extending edges of the coilable structure to facilitate coupling gears to the driving motor. With this approach slippage, which can cause lateral deviation of print head 1630, is minimized. In those embodiments in which a preloaded spring maintains the wound condition of the coilable structures, an actuator driving gears which mesh with teeth on the coiled material of the coiled structures provides the force needed to pull the coiled material into an uncoiled state and then return the material to the coiled state. Alternatively, instead of a preloaded spring, a motor may be placed in the core of the coilable structures to wind and unwind the coiled material. This approach is illustrated in FIG. 17, in which motor 1710 rotates at a variable ratio to motor 1720 depending on how much of coiled material 1740 remains in coiled structure 1750 to minimize drag on the movement of coiled material 1740 through gears 1730.

While the present invention has been illustrated and described with reference to specific embodiments, further modification and improvements will occur to those skilled in the art. It is to be understood, therefore, that this invention is not limited to the particular forms illustrated and that it is intended in the appended claims to embrace all alternatives, modifications, and variations which do not depart from the spirit and scope of this invention.

What is claimed:

1. A portable, compact electronic device adapted for communication with a personal digital assistant, the electronic device comprising:

a housing having an opening adapted for receiving a medium adapted for printing or scanning;

not less than one coiled structure including a coilable material;

not less than one guide for positioning said coilable material as it is extended from said coiled structure;

not less than one rotating element for moving said medium adapted for printing or scanning through said opening in said housing;

activation means for performing printing or scanning of said medium adapted for printing or scanning; and control means for extension and retraction of said coilable material from said coiled structure.

2. The portable, compact electronic device according to claim 1, wherein said not less than one coiled structure comprises a plurality of coiled structures.

3. The portable, compact electronic device according to claim 1, wherein said not less than one coiled structure comprises two coiled structures.

4. The portable, compact electronic device according to claim 1, wherein said activation means comprises a printer head.

5. The portable, compact electronic device according to claim 1, wherein said activation means comprises a scanner head.

6. The portable, compact electronic device according to claim 1, further comprising not less than one means for supporting said activation means.

7. The portable, compact electronic device according to claim 6, wherein said means for supporting said activation means comprises not less than one rolling element.

8. The portable, compact electronic device according to claim 1, wherein said coiled structure is positioned in a plane, said plane being parallel to a horizontal plane.

9. The portable, compact electronic device according to claim 1, wherein said coiled structure is positioned in a plane, said plane being orthogonal to a horizontal plane.

10. The portable, compact electronic device according to claim 1, wherein said control means comprises not less than one motor.

11. The portable, compact electronic device according to claim 1, wherein said control means comprises not less than one preloaded spring.

12. The portable, compact electronic device according to claim 1, further comprising a hinged structure supporting said coiled structure.

13. The portable, compact electronic device according to claim 1, wherein said housing further comprises a ramp.

14. The portable, compact electronic device according to claim 1, further comprising not less than one means for moving the electronic device on a surface.

15. The portable, compact electronic device according to claim 14, wherein said not less than one means for moving the electronic device comprises not less than one rolling element.

16. The portable, compact electronic device according to claim 1, further comprising positional deviation correction means.

17. The portable, compact electronic device according to claim 16, wherein said positional deviation correction means comprises a laser emitter.

18. The portable, compact electronic device according to claim 17, wherein said positional deviation correction means further comprises a linear optical sensor.

19. The portable, compact electronic device according to claim 16, wherein said positional deviation correction means further comprises gears for adjusting the position of said activation means.

20. The portable, compact electronic device according to claim 19, further comprising an actuator for causing rotation of said gears.

21. The portable, compact electronic device according to claim 1, wherein said coiled structure comprises a single coiled structure.

22. The portable, compact electronic device according to claim 1, further comprising a coilable signal structure.

23. The portable, compact electronic device according to claim 22, wherein said coilable signal structure comprises not less than one signal cable.

24. The portable, compact electronic device according to claim 22, wherein said coilable signal structure comprises not less than one power cable.

25. The portable, compact electronic device according to claim 1, wherein said coilable material further comprises teeth formed in not less than one extending edge of said coilable material.

26. The portable, compact electronic device according to claim 25, wherein said teeth are formed in two extending edges of said coilable material.

27. The portable, compact electronic device according to claim 1, further comprising not less than one gear adapted for controlling the movement of said coilable material.

28. The portable, compact electronic device according to claim 1, wherein said control means comprises not less than two actuators.

29. The portable, compact electronic device according to claim 28, wherein said not less than two actuators comprise not less than one actuator for controlling at least one of said not less than one coiled structures.

30. The portable, compact electronic device according to claim 27, further comprising not less than one actuator adapted for controlling said not less than one gear adapted for controlling the movement of said coilable material.

31. The portable, compact electronic device according to claim 28, wherein not less than one actuator controlling the movement of said coiled structure operates at a variable ratio to the operation of a not less than one actuator controlling movement of said not less than one gear adapted for controlling the movement of said coilable material.

32. The portable, compact electronic device according to claim 1, further comprising means for measuring the amount of said coiled material extended from said coiled structure.

33. The portable, compact electronic device according to claim 32, wherein said means for measuring the amount of said coiled material extended from said coiled structure comprises spaced marks printed along the length of said coilable material.

* * * * *